United States Patent [19]

Haubold et al.

[11] Patent Number: 4,714,961
[45] Date of Patent: Dec. 22, 1987

[54] PROCESS AND CIRCUIT ARRANGEMENT FOR THE REMOTE PICK UP AND REPRODUCTION OF IMAGES OF STATIC OR MOVING OBJECTS

[75] Inventors: Heinz-Günter Haubold, Jülich; Peter Hiller, Düren, both of Fed. Rep. of Germany

[73] Assignee: Kernforschungsanlage Julich GmbH, Julich, Fed. Rep. of Germany

[21] Appl. No.: 862,764

[22] Filed: May 13, 1986

[30] Foreign Application Priority Data

May 17, 1985 [DE] Fed. Rep. of Germany ....... 3517737

[51] Int. Cl.$^4$ ............................................. H04N 5/235
[52] U.S. Cl. ..................................... 358/209; 358/211
[58] Field of Search ............... 358/211, 219, 223, 217, 358/218, 209

[56] References Cited

U.S. PATENT DOCUMENTS

| | | | |
|---|---|---|---|
| 3,716,657 | 2/1973 | Niemyer, Jr. | 358/211 |
| 4,503,466 | 3/1985 | Ryan | 358/211 |
| 4,593,321 | 6/1986 | Blom et al. | 358/219 |
| 4,595,955 | 6/1986 | Groves et al. | 358/219 |

FOREIGN PATENT DOCUMENTS 2152029 9/1972 Fed. Rep. of Germany.
3007620 11/1984 Fed. Rep. of Germany.

Primary Examiner—Gene Z. Rubinson
Assistant Examiner—Stephen Brinich
Attorney, Agent, or Firm—Karl F. Ross; Herbert Dubno

[57] ABSTRACT

A process and apparatus for the remote pickup and reproduction of image of static or dynamic objects in which dark regions of a target provide outputs below a threshold value which are normalized or averaged through a divider during intervals of line scan interruption brought about by the detection of a below threshold level. The system, therefore, allows integration during the interval and by averaging and integrating values permits discernment of features which might otherwise be obscured by a leveling effect in dark regions.

10 Claims, 2 Drawing Figures

PROCESS AND CIRCUIT ARRANGEMENT FOR THE REMOTE PICK UP AND REPRODUCTION OF IMAGES OF STATIC OR MOVING OBJECTS

FIELD OF THE INVENTION

Our present invention relates to a process for the remote pickup and reproduction of static or moving objects, also referred to herein as dynamic objects, whereby a pickup camera viewing the object is operated in a standard cycle to generate individual images and these images in sequence are delivered to a reproduction unit or an intermediate storage facility connected ultimately to the reproduction unit. Such cameras can integrate electrical changes in dependency upon the brightness of the object field on a target of the pickup camera, the integrating charge levels of the target being read out in a line-by-line scan, hereinafter referred to as line-scan reading, and being supplied in the form of corresponding electrical signals to the reproduction unit or intermediate storage.

The invention also relates to a circuit arrangement for carrying out the process of the invention and, specifically, to a circuit arrangement between a pickup camera with a target upon which electric changes are integrated in dependence upon the brightness of the object field and a reproduction or intermediate image storage unit, which includes, in accordance with the invention, a circuit element for enabling interruption of the readout of these electric changes.

BACKGROUND OF THE INVENTION

Static and dynamic image reproduction at a remote location can be employed for both optical viewing and X-ray image reproduction for both static and dynamic objects. Reproduction of the brightness of an object is limited, however, by the dynamic range of the target of the pickup camera. When high contrast objects are in the field of view, the bright image points of the object lie as a rule in the dynamic range, while object points or regions of reduced brightness or radiation of reduced intensity can lie below the dynamic range.

In the present discussion, while reference may be made to "brightness" of an image, in accordance with the terminology used for optical image reduction, it should be understood that the term is employed also to refer to high intensity portions of an image field on the target as contrasted with low intensity portions in X-ray practice or of other image reproduction techniques.

The object points of reduced brightness generally are reproduced in the reproduced image of the object as image points of the same brightness. As a consequence, one cannot readily differentiate such object points of reduced brightness even though the brightness of these objects points may differ markedly, because of this levelling phenomenon. The structure of the so called "dark regions" of the object can generally not be ascertained in the reproduced image.

This limitation in the reproducibility of the appearance of the object in the image is by far one of the most important drawbacks of earlier pickup and reproduction techniques.

The problem is especially pronounced when the greatest possible degree of reproduction of the appearance of an object is desired, i.e. when practically total reproduction precision is desired.

For example, if this drawback is seen in light of X-ray technology and especially medical X-ray technology, it can be appreciated that the tendency to provide a uniform "dark region" corresponding to the portions of the object of the reduced radiation intensity, will reduce detrimentally the amount of information available as to the patient and is clinically a handicap.

It is possible to overcome this drawback by increasing the X-ray dose, but this approach places the patient, who must be exposed to the increased radiation dose at risk.

OBJECTS OF THE INVENTION

It is, therefore, the principal object of the present invention to provide a process for the remote pickup and reproduction of static or movable objects which will allow a more detailed reproduction of those regions of an object which normally have been characterized heretofore as having a brightness or radiation intensity lying below the dynamic range of the camera.

Another object of our invention is to provide an improved circuit arrangement for carrying out the improved method of the invention.

SUMMARY OF THE INVENTION

These objects and others which will become apparent hereinafter are attained, in accordance with the invention in a method for the remote pickup and reproduction of images of static or moving objects in accordance with the above-described principles wherein, below a predetermined threshold of the integrated charge for a certain target region as detected by the line-scan reading, the line-scan reading process is interrupted for a predetermined number of standard cycles.

After the target-reading interruption period, the charge can then be read out from the respective target region, and the respective signal normalized to the standard cycle and delivered to the reproduction unit. In this manner we are able to reproduce images of the object even for the dark region where there are differences in brightness and are able to deliver to the reproduction unit signals allowing distinction or discernability of the structure of these dark regions.

Advantageously, the threshold value is a value in the lower part of the dynamic range of the target of the pickup camera or corresponds to a valve below the dynamic range. The number of standard cycles for which the line-scan reading is interrupted is determined in consideration of the speed of movement of the object. For more rapid movement of the object, we can use a reduced count of the number of standard cycles for line-scan reading interruption whereas with slower movement of the object or static or stationary object a greater count of the number of standard cycles is used.

To prevent the integrated charge level during the line scan interruption period from exceeding the dynamic range of the target count, the count of standard cycles for line-scan interruption is selected as a maximum such that the greatest possible integrated charge over the time interval of the interruption will remain within the dynamic range of the pickup camera.

It has also been found to be advantageous to interrupt the line-scan reading process by applying a blocking potential to an appropriate grid or electrode of the pickup camera.

According to an important aspect of the method of the invention, the integrated charge quantity is read out at a corresponding value is stored in an image reproduction memory coupled to the target. Thus when directly following an interruption interval a further interruption period is provided, during the further interruption, a signal corresponding to a value previously stored in the image reproduction memory is outputted.

In this manner even during the interruption process a signal can be delivered to the reproduction unit which corresponds to the brightness of the image points during the preceding interruption.

When the brightness does not increase too rapidly, or with a corresponding selection of the number of the interruption cycles, the reproduction brightness of the dark regions can be improved.

In the case in which a further line-scan interruption period does not directly follow a line-scan interruption, the charge level stored in the image-reproduction memory is replaced by the actual value during the standard cycle in progress.

In its method aspect, the invention can thus be described as a process for the remote pickup and reproduction of images of static or dynamic objects, comprising the steps of:

registering individual images of an object in a standard image pickup cycle with a pickup camera;

integrating accumulation of electric charges upon a target of the pickup camera representing image-density characteristics of each of the individual images;

line-scan reading the target and generating electrical signals representing the integrated electric charges;

interrupting the line-scan reading of the electric charges of at least a region of the target at which accumulation of the charges is less than a predetermined threshold charge level for a predetermined number of the standard cycles following the interruption;

following the predetermined number of standard cycles, recommencing the line-scan reading of the electric charges while normalizing the read level of charges at the region in the production of the signals from the electric charges;

storing values representing the signals; and reproducing images by outputting the stored values such that when an interruption of line-scan reading of the electric charges directly follows a preceding the interruption, a value representing a signal previously stored is used in the reproduction of an image during the following interruption.

The predetermined threshold charge level can be a value at a lower part of the dynamic range of the pickup camera or a value below the dynamic range of the pickup camera.

The predetermined number of the standard cycles for which the reading of electric charges is interrupted is preferably selected as a function of the speed of the object whose images are registered.

The predetermined number of the standard cycles can have as its maximum a number of standard cycles in which the integrated charge quantity during the reading-interruption periods remains in the the dynamic range of a target of the pickup camera.

A value corresponding to the read integrated electric charges can be stored in an image-repetition memory (IRM), and when a further reading interruption directly follows a reading interruption, a value previously stored in the image-repetition memory (IRM), is derived from the image-repetition memory (IRM).

The apparatus aspect of the invention provides a circuit arrangement for a pickup camera for the remote pickup and reproduction of images of static or dynamic objects wherein the camera has a target upon which electric charges are integrated and accumulate as a function of optical density characteristics of an image of an object and which also includes a unit which can interrupt reading of integrated charges. The combination of the invention can include:

a threshold value detector;

a two-dimensional range storage assigned to the target and synchronized with the reading thereof;

a two-dimensional digital counter operatively connected to the range storage and operating synchronously with the reading of the target;

a divider directly connected to the target; and a switch connected between the divider and the threshold value detector;

the threshold value detector, upon the readout from the target of a predetermined threshold value of integrated charge, generating an output signal and upon readout of a charge level below the threshold value triggering logic circuitry connected to the range storage and the counter to interrupt a readout from the target;

the switch connecting the target to the threshold value detector in a normal setting to pass signals read from the target to the threshold value detector during periods in which readout from the target is not interrupted, but connecting the divider with the threshold value detector in an interrupted setting during periods when readout from the target is interrupted;

the two-dimensional range storage being enabled by a signal from the threshold value detector to store a charge level corresponding to a dark range below the predetermined threshold value, and to output a signal triggering the switch into its interrupted setting through further logic circuitry upon a successive reading of the dark range;

the counter counting up output signals from the threshold value detector and serving to accumulate a count of standard cycles following storage of a range in the range storage;

an interrogation unit is provided and is connected to the counter for resetting the two-dimensional range storage upon the development of a count representing a target-reading interruption period to terminate the target-reading interruption period, for deleting the stored value in the range storage marking the corresponding dark range, resetting the content of the counter for the next standard cycle to zero, and shifting the switch via the further logic circuitry in a retarded manner into its interrupted setting, whereby the integrated charge during the target-reading interruption period is via the divider applied to a playback device normalized with respect to a standard-cycle signal or to an intermediate storage.

Advantageously the circuit arrangement has a two-dimensional image-repetition memory connected to the target is provided between the divider and the switch for the target-reading interruption period;

an analog-to-digital converter is connected at an input side of the two-dimensional image-repetition memory;

a digital-to-analog converter is connected at an output side of the two-dimensional image-repetition memory;

a signal outputted from the threshold value detector causes the two-dimensional image-repetition memory to transfer its contents corresponding to a dark region through the digital-to-analog converter as the normalized signal to the playback device or to the intermediate storage during the target-reading interruption period; and after termination of each target-reading interruption period the charge integrated in the interim is read by the divider to the analog-to-digital converter and then stored in digital form in the two-dimensional image-repetition memory (BWS).

The circuit arrangement can also have a second switch synchronized with the first switch and is provided at an input side of the analog-to-digital converter and shunts the divider in the normal setting of the first-mentioned switch, and in the interrupted setting of the first-mentioned switch, connects the divider with the analog-to-digital converter.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
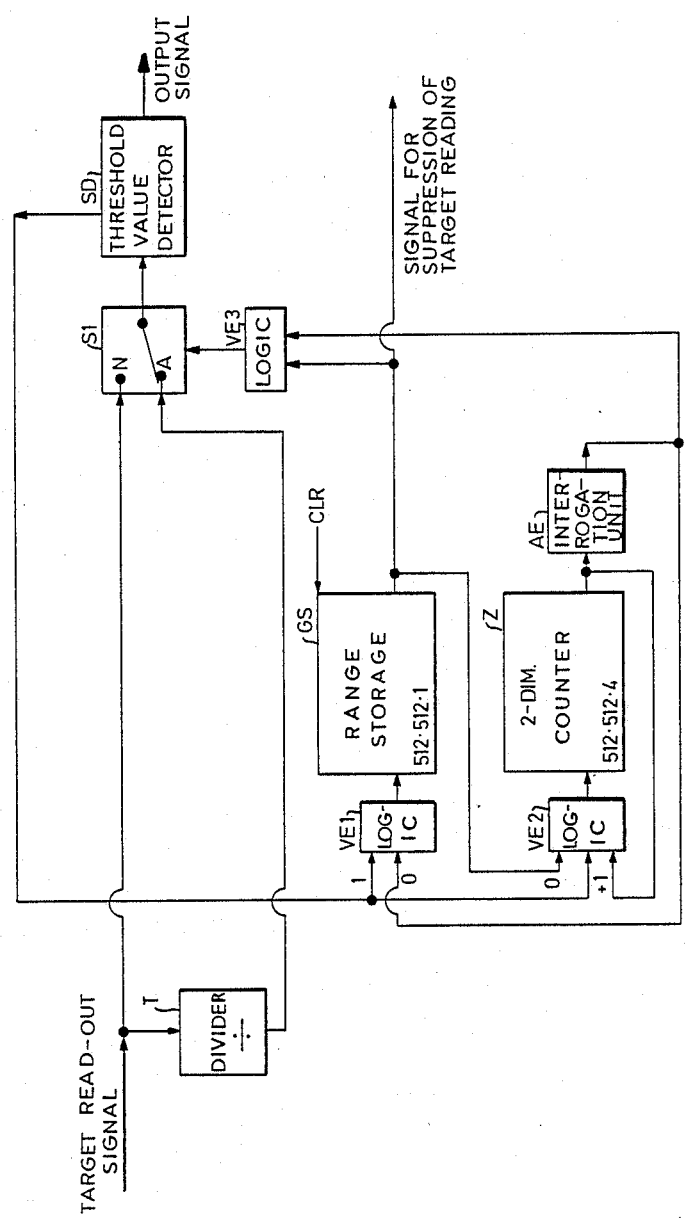
FIG. 1 is a block diagram illustrating the principles of the invention in a simplified embodiment.

In the circuit shown in FIG. 1 the switch S1 is shown in its line-scan interrupt position A. This switch setting applies in the phase of operation in which the scanning of a target region has generated a signal at the threshold value detector SD of an accumulated charge level below the threshold value.

In all other phases, namely, when the target is initially scanned for the pickup or when the scanned regions of the target show charge accumulations above the threshold value detector, the switch S1 is in its normal setting N. In this normal setting, the signal read from the target is delivered via the switch S1 through the threshold value detector SD and then to a reproduction unit, e.g. a display monitor such as a CRT display or to an intermediate storage or memory which may be connected in turn to such a display.

Since the camera, the line scanning control of the camera, the principles of charge accumulation on the camera target, the monitor or CRT display and intermediate storage circuitry as described are all well known in the art, e.g. for X-ray remote imaging, they have not been illustrated here.

When a signal is obtained from the threshold value detector SD representing a read out from the target of a particular range, while the switch S1 is in its normal setting, lying below the threshold value, the threshold detector SD generates via the logic circuit VE1, which can be a gate or flip flop, an output which is applied to the range store GS, the latter being a 512×512×1 storage to set the latter and store the resulting value representing a direct region of the target.

The counter Z (which can be a 512×512×4 interrogation-time memory) also receives the signal from the threshold value detector SD via the logic element VE2 so that this counter is upcounted by one counting stage.

If, in this manner, a direct region is ascertained then in the next scanning or reading cycle of the same target region a control signal is delivered by the range storage for suppression of target reading, thereby establishing a line scan reading interruption. This interruption can be effected by the application of a blocking potential for the reading beam or scanning beam of the camera.

The range storage GS in combination with the counter Z via the logic element VE3 which can be an AND gate, reset the switch S1 into its interrupt setting A.

The interrupt setting for the direct region remains for a predetermined number of standard cycles, for example 16.

To this end, the interrogation unit AE ascertains the counter state at each cycle. One cycle before the count of the predetermined number of standard cycles ends, the interrogation unit AE resets the range counter GS via the logic element VE1 to extinguish the respective direct region. The signal is also applied from the interrogation unit to the logic element VE3 to retain the interrupt setting of switch S1 for another cycle.

The resetting of the range storage GS ensures that for the standard cycle following the interrupt period, the line-scan reading will no longer be interrupted but rather that the charge accommodated or integrated in the interim in the associated dark region of the target will be read out.

Since the switch S1 remains in its interrupt setting by reason of the output from the interrogation unit AE although the counter Z has been reset, the read integrated charge level is delivered by the divider T to the output line, divided by the number of standard cycles of the interruption, in this case 16, the divider having a ratio 1/16. For the next cycle the switch S1, delayed, is returned to its normal setting.

As a consequence, the dark regions of the target and hence of the object field are characterized by average values of integrated charge over a multiplicity of standard cycles during interruption and during this interruption considerable charge can accumulate which, upon division can provide a significant measurement of level and assure discerning of features of the object field which might otherwise be obscured by the levelling effect which has been described.

Figure 2:
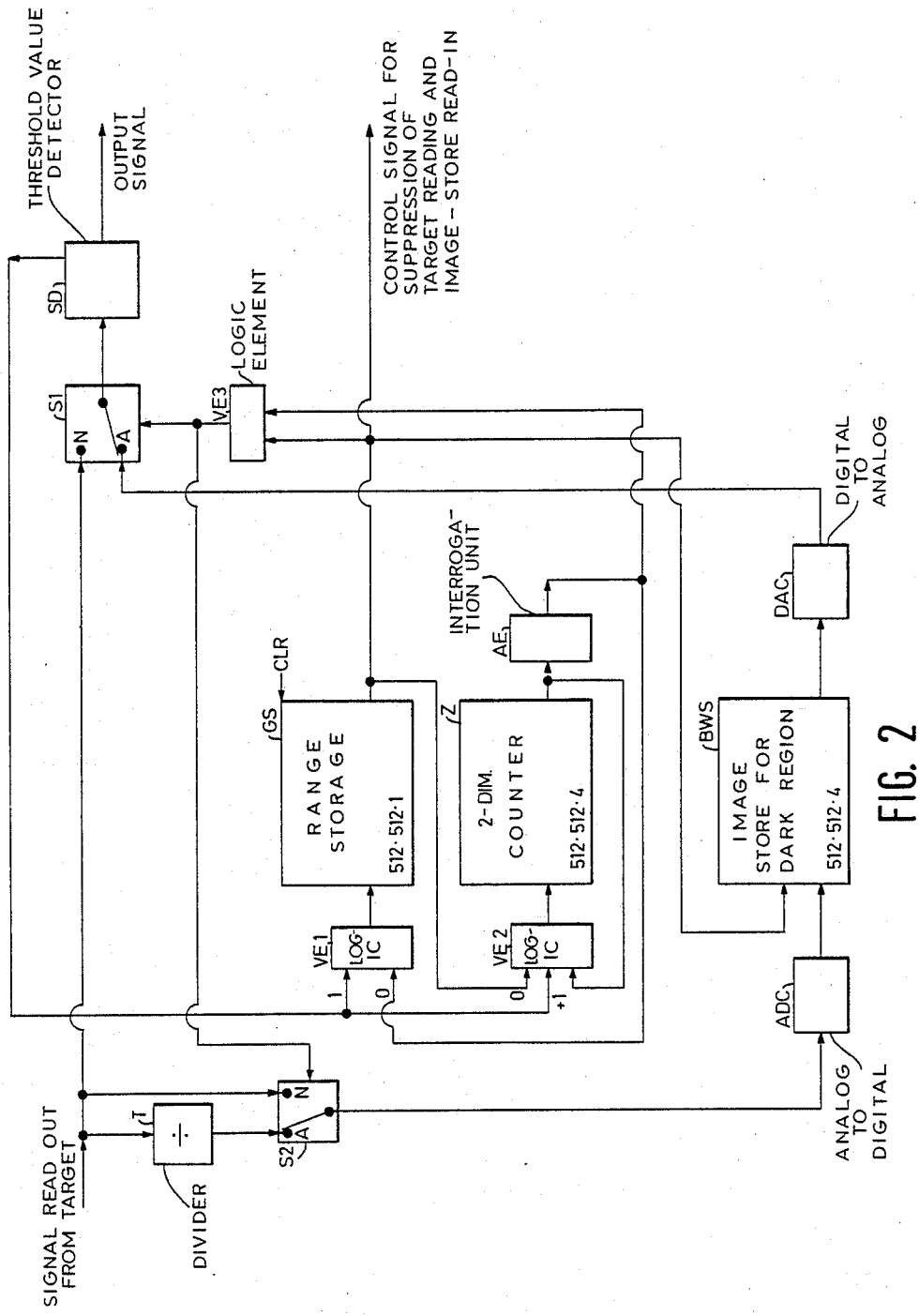
FIG. 2 is a similar diagram of a somewhat more complicated circuit using an additional image repetition storage memory.

FIG. 2 shows an embodiment in which an addition image repetition storage or memory BWS is provided.

In this circuit variant, all of the signals reading from the target can be stored in the image repetition memory BWS. Those signals which lie above the threshold value defined by the threshold value detector SD are stored directly after analog/digital conversion in the analog-to-digital converter ADC without passing through the divider T.

To this end, the switch S2 is parallel to the switch S1 will be in its normal setting N and shunts the divider T.

A signal from the dark region below threshold, normalized or averaged in the divider T is, however, stored in the image repetition storage BWS when the switch S2 is in the line scan interrupt position A. Naturally, the divider T, if desired with the switch S2 can be provided at the output side of the image repetition memory BWS.

In cases in which the charge level of the target represents a dark region and has a value below the threshold after a line scan interruption (in all static cases but even usually with dynamic objects), during the subsequent line scan interruption period in which the switch S1 is still in its interrupt setting A, a signal is outputted through the digital-to-analog converter DAC.

In the case in which the charge reading from the target of a previously dark region and following a line scan interrupt interval lies above the threshold value, the signal is directly outputted and also stored in the image repetition memory BUS and thereby extinguishes the previously stored integrated value.

We claim:

1. A process for the remote pickup and reproduction of images of static or dynamic objects, comprising the steps of:
   registering individual images of an object in a standard image pickup cycle with a pickup camera;
   integrating accumulation of electric charges upon a target of said pickup camera representing image-density characteristics of each of said individual images;
   line-scan reading said target and generating electrical signals representing the integrated electric charges;
   interrupting the line-scan reading of the electric charges of at least a region of said target at which accumulation of said charge is less than a predetermined threshold charge level for a predetermined number of said standard image pickup cycles following the interruption;
   following said predetermined number of standard image pickup cycles, recommencing the line-scan reading of said electric charges while normalizing the read level of charges at said region in the production of said signals from said electric charges;
   storing values representing said signals; and
   reproducing images by outputting the stored values such that when an interruption of line-scan reading of said electric charges directly follows a preceding said interruption, a value representing a signal previously stored is used in the reproduction of an image during the following interruption,
   said predetermined number of said standard image pickup cycles for which the reading of electric charges is interrupted is selected as a function of the speed of the object whose images are registered.

2. The process defined in claim 1 wherein said predetermined threshold charge level is a value at a lower part of the dynamic range of the pickup camera.

3. The process defined in claim 1 wherein said predetermined threshold charge level is a value below the dynamic range of the pickup camera.

4. The process defined in claim 1 wherein said predetermined number of said standard image pickup cycles has as its maximum a number of standard image pickup cycles in which the integrated charge quantity during the interruption of line-scan reading remains in the dynamic range of a target of the pickup camera.

5. The process defined in claim 1 wherein said reading of electric charges is interrupted by application of a blocking voltage to a respective grid or electrode of the pickup camera.

6. The process defined in claim 1 wherein a value corresponding to the read integrated electric charges is stored in an image-repetition memory (IRM), and when a further reading interruption directly follows a reading interruption, a value previously stored in said image-repetition memory (IRM), is derived from said image-repetition memory (IRM).

7. The process defined in claim 7 wherein a value corresponding to the read integrated electric charges is stored in an image-repetition memory (IRM), and when a further reading interruption does not dirctly follow a reading interruption, the value stored in said image-repetition memory (IRM) is replaced by a value of currently read integrated electric charges.

8. In a circuit arrangement for a pickup camera for the remote pickup and reproduction of images of static or dynamic objects wherein the camera has a target upon which electric charges are integrated and accumulate as a function of optical density characteristics of an image of an object and which also includes a unit which can interrupt reading of integrated charges, the improvement which comprises the combination therewith of:
   a threshold value detector (SD);
   a two-dimensional range storage (GS) assigned to said target and synchronized with the reading thereof;
   a two-dimensional digital counter (Z) operatively connected to said range storage and operating synchronously with the reading of the target;
   a divider (T) directly connected to said target; and
   a first switch (S1) connected between said divider and said threshold value detector (SD);
   said threshold value detector (SD), upon the readout from said target of a predetermined threshold value of integrated charge, generating an output signal and upon readout of a charge level below said threshold value triggering logic circuitry (VE 1, VE 2) connected to said range storage and said counter to interrupt a readout from said target;
   said first switch (S1) connecting said target to said threshold value detector in a normal setting to pass signals read from said target to said threshold value detector during periods in which readout from said target is not interrupted, but connecting said divider (T) with said threshold value detector in an interrupted setting during periods when readout from said target is interrupted;
   said two-dimensional range storage (GS) being enabled by a signal from said threshold value detector (SD) to store a charge level corresponding to a dark range below said predetermined threshold value, and to output a signal triggering said first switch (S1) into its interrupted setting through further logic circuitry upon a successive reading of said dark range;
   said counter (Z) counting up output signals from said threshold value detector (SD) and serving to accumulate a count of standard cycles following storage of a range in said range storage (GS); and
   an interrogation unit (AE) is provided and is connected to said counter (Z) for resetting said two-demensional range storage (GS) upon the development of a count representing a target-reading interruption period to terminate said target-reading interruption period, for deleting the stored vaalue in said range storage (GS) marking the corresponding dark range, resetting the content of the counter (Z) for the next standard cycle to zero, and shifting the switch (S 1) via the further logic circuitry (VE 3) in a retarded manner into its interrupted setting,
   whereby the integrated charge during said target-reading interruption period is via the divider (T) applied to a playback device normalized with respect to a standard-cycle signal or to an intermediate storage.

9. The circuit arrangement defined in claim 8 wherein:

a two-dimensional image-repetition memory (BWS) connected to the target is provided between said divider (T) and said switch for the target-reading interruption period;

an analog-to-digital converter (ADC) is connected at an input side of said two-dimensional image-repetition memory (BWS);

a digital-to-analog converter (DAC) is connected at an output side of said two-dimensional image-repetition memory (BWS);

a signal outputted from said threshold value detector (SD) causes said two-dimensional image-repetition memory (BWS) to transfer its contents corresponding to a dark region through said digital-to-analog converter (DAC) as said normalized signal to said playback device or to said intermediate storage during said target-reading interruption period; and after termination of each target-reading interruption period the charge integrated in the interim is read by said divider (T) to said analog-to-digital converter (ADC) and then stored in digital form in said two-dimensional image-repetition memory (BWS).

10. The circuit arrangement defined in claim 9, further comprising a second switch (S 2) synchronized with said first switch and is provided at an input side of said analog-to-digital converter (ADC) and shunts said divider (T) in said normal setting of the first switch (S 1), and in said interrupted setting of the first switch (S 1), connects said divider (T) with said analog-to-digital converter (ADC).

* * * * *